United States Patent [19]

Yokooku et al.

[11] Patent Number: 4,627,311
[45] Date of Patent: Dec. 9, 1986

[54] AUTOMOTIVE DRIVING CONTROL SYSTEM UTILIZING A STEPLESS TRANSMISSION

[75] Inventors: Katsuhiko Yokooku; Nobuhide Seo; Hiroyuki Oda; Shizuo Sumida; Satoshi Yatomi, all of Hiroshima, Japan

[73] Assignee: Mazda Motor Corporation, Japan

[21] Appl. No.: 591,876

[22] Filed: Mar. 21, 1984

[30] Foreign Application Priority Data

Apr. 11, 1983 [JP] Japan ................... 58-64364

[51] Int. Cl.$^4$ .................. B60K 41/18; B60K 41/12
[52] U.S. Cl. ........................... 74/866; 74/870; 74/877; 364/424.1
[58] Field of Search .............. 74/866, 870, 877; 364/424-431; 123/559

[56] References Cited

U.S. PATENT DOCUMENTS

| | | | |
|---|---|---|---|
| 4,107,776 | 8/1978 | Beale | 364/424.1 X |
| 4,291,594 | 9/1981 | Baudoin | 74/877 X |
| 4,350,135 | 9/1982 | Casey et al. | 123/564 |
| 4,383,456 | 5/1983 | Ganoung | 74/877 X |
| 4,438,664 | 3/1984 | Fiala | 74/877 X |
| 4,458,560 | 7/1984 | Frank et al. | 74/877 X |
| 4,458,561 | 7/1984 | Frank | 74/877 X |
| 4,459,878 | 7/1984 | Frank | 74/877 X |
| 4,485,793 | 12/1984 | Oguma | 123/559 |
| 4,505,169 | 3/1985 | Ganoung | 74/866 X |
| 4,507,986 | 4/1985 | Okamura et al. | 74/859 X |

FOREIGN PATENT DOCUMENTS 0073475 3/1983 European Pat. Off. .............. 74/866
53-134162 11/1978 Japan .
1556888 11/1979 United Kingdom ................ 74/866

OTHER PUBLICATIONS

"Continuously Variable Transmission Control", Ironside et al., Proceedings of the Technical Programme of Internepoon UK '80, Oct. 14-16, 1980, pp. 295-302.

Primary Examiner—Kenneth J. Dorner
Assistant Examiner—Dirk Wright
Attorney, Agent, or Firm—Gerald J. Ferguson, Jr.; James E. Bryan; Michael P. Hoffman

[57] ABSTRACT

An automotive driving control system comprises a stepless transmission provided between the engine and the driving wheels, a transmission controller for controlling the transmission ratio of the stepless transmission, a throttle valve driver for driving the throttle valve of the engine, and a controller for controlling the transmission controller and the throttle valve driver. The controller controls the transmission controller and the throttle valve driver according to the amount of depression of the accelerator pedal. When the amount of depression of the accelerator pedal is within a predetermined range, the controller controls the throttle valve driver so that the opening degree of the throttle valve is fixed at a predetermined value irrespective of the amount of depression of the accelerator pedal, and controls the transmission controller to control the transmission ratio of the transmission so that an engine output corresponding to the amount of depression of the accelerator pedal can be obtained taking into account the predetermined value of the opening degree of the throttle valve.

15 Claims, 14 Drawing Figures

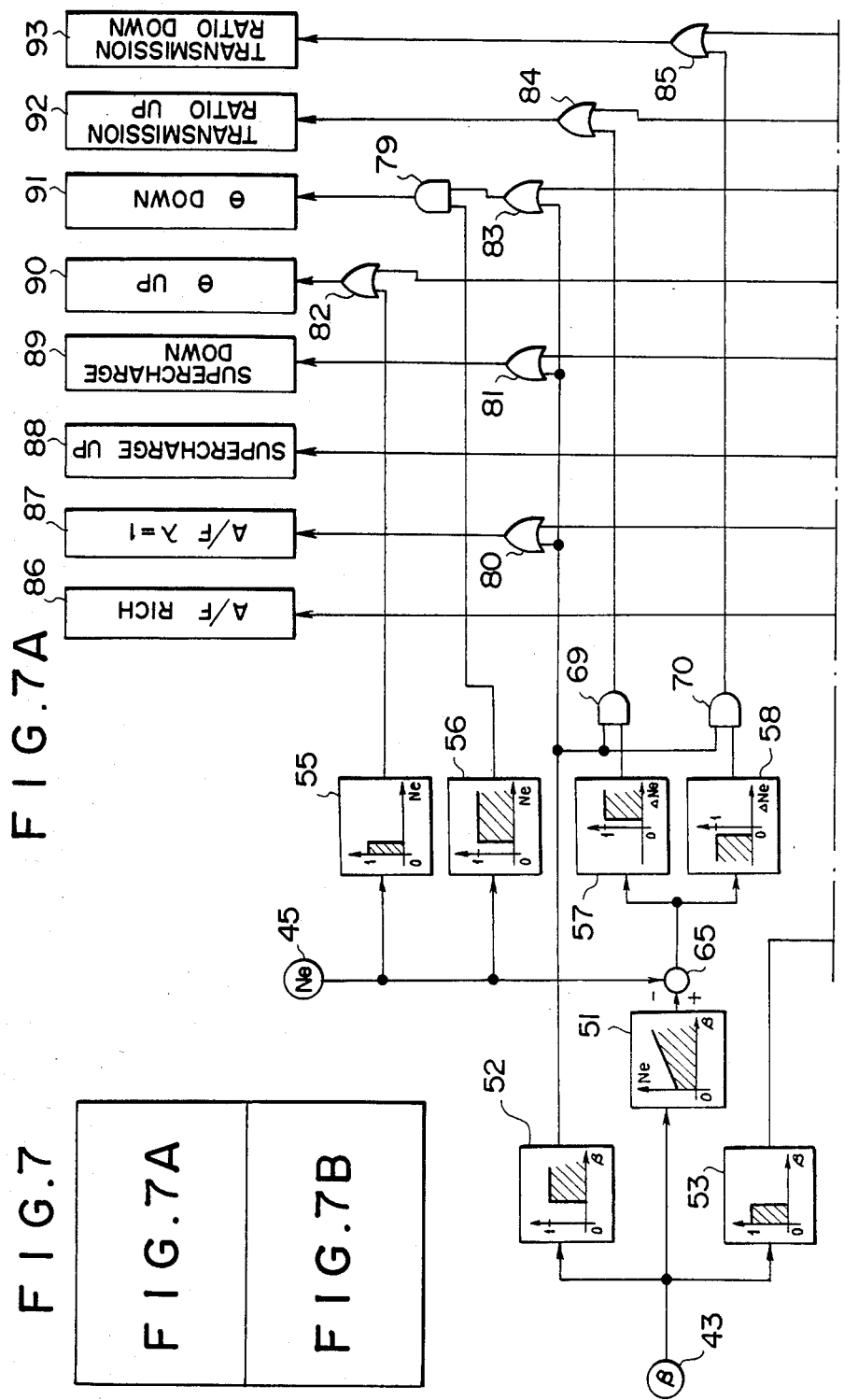

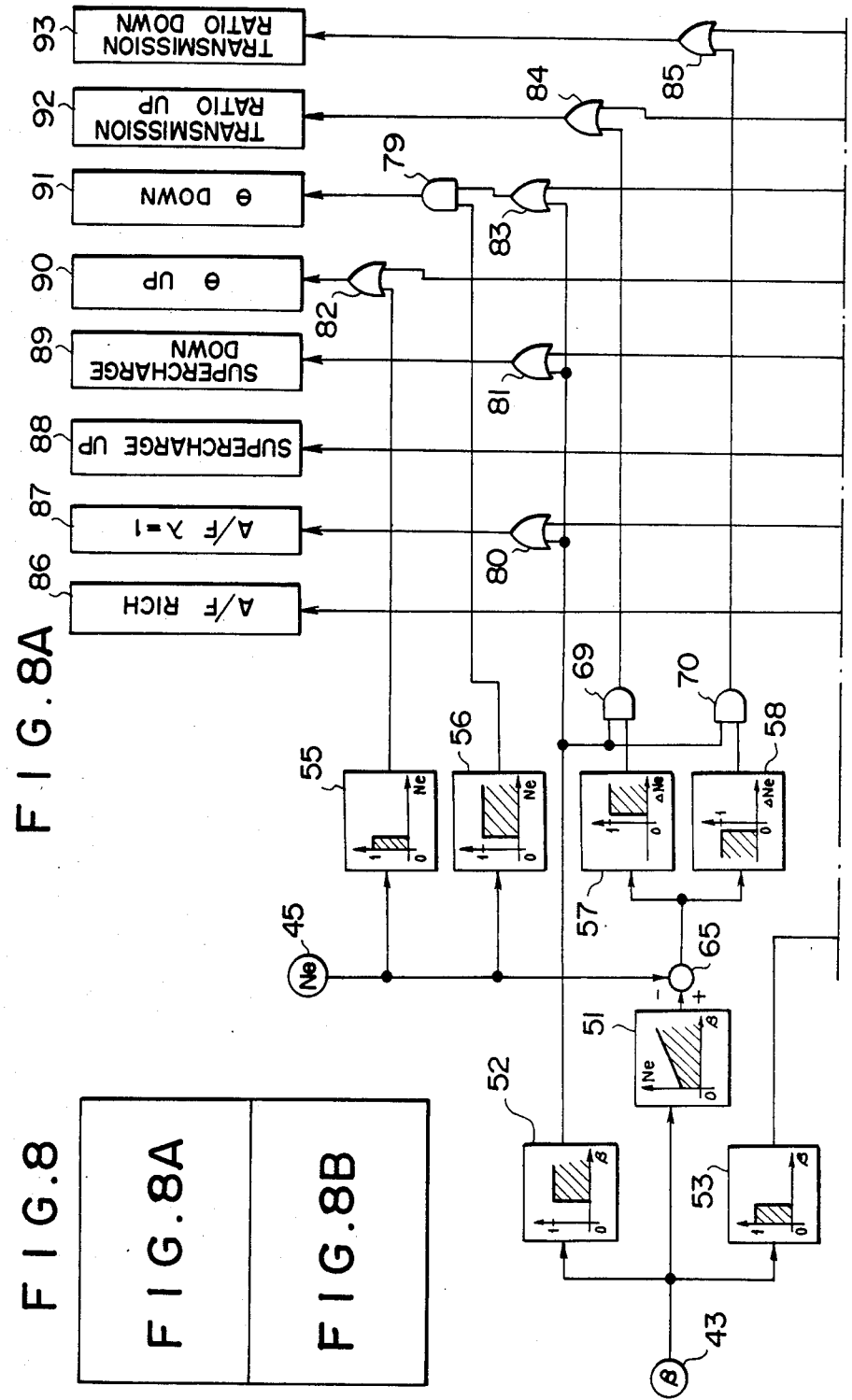

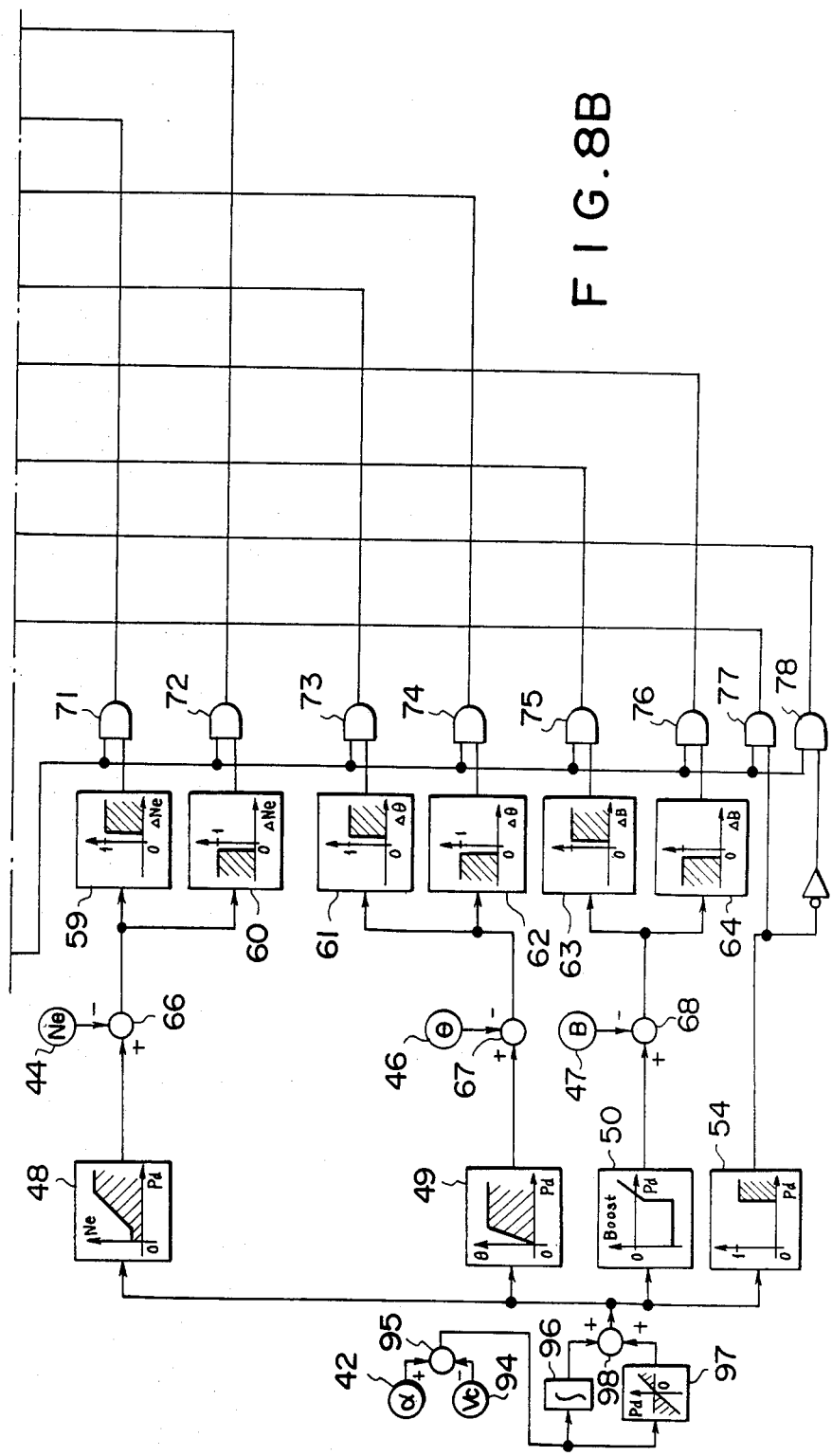

AUTOMOTIVE DRIVING CONTROL SYSTEM UTILIZING A STEPLESS TRANSMISSION

BACKGROUND OF THE INVENTION

1. Field of the Invention

This invention relates to an automotive driving control system, and more particularly to an automotive driving control system for controlling the driving state of an automobile determined by engine speed, torque and the like to a desired state in response to depression of the accelerator pedal.

2. Description of the Prior Art

In FIG. 1a, curves E1, E2 and E3 are contour lines joining points of equal specific fuel consumption in an ordinary automobile depicted on an orthogonal coordinate system which is used to express the operating state of an automobile, the abscissa and the ordinate respectively representing the engine speed (Ne) and the engine torque (Te). In other words, in the ordinary automobile in which a transmission having set transmission ratios is used and the engine output and/or the vehicle speed are controlled by changing the opening degree of the throttle valve, it is necessary to set the engine so that the region D of minimum specific fuel consumption corresponds to an opening degree of the throttle valve slightly smaller than the full or maximum opening degree in order to obtain a large torque during, for instance, acceleration by full opening the throttle valve and at the same time actuating, for instance, an air-fuel ratio enriching device, thereby ensuring reserve torque. When controlling the driving state of an automobile provided with such an engine, it is preferred that the operating state of the automobile be caused to fall within the region D of minimum specific fuel consumption bounded by the curve E1 or near thereto. Curve A in FIG. 1a is a contour line, for the full opening degree of the throttle valve.

In Japanese Unexamined Patent Publication No. 53(1978)-134162, there is disclosed an automotive driving control system embodying a concept for improving the specific fuel consumption. In the control device, the opening degrees and the transmission ratios optimal for the purpose described above are calculated for various operating states of the automobile and mapped, and an optimal throttle valve opening degree and an optimal transmission ratio are read out from the map according to the particular amount of depression of the accelerator pedal to control the throttle valve opening degree and the transmission ratio of the transmission.

In all of the conventional driving control systems, desired engine output and vehicle speed are obtained by controlling the opening degree of the throttle valve to change the volumetric efficiency according to the amount of depression of the accelerator pedal. This control is disadvantageous in that when the opening degree of the throttle valve is small, so-called pumping loss of the engine output occurs due to negative pressure generated downstream of the throttle valve, whereby the specific fuel consumption is lowered.

SUMMARY OF THE INVENTION

The primary object of the present invention is to provide an improved automotive driving control system which is based on a novel control method and is capable of substantially improving the specific fuel consumption.

A study of the driving control of an automobile from the viewpoint of the engine speed-torque characteristics reveals the following.

In FIG. 1b, line A is an engine speed-torque characteristic curve showing the relationship between torque and speed in case that the throttle valve is fixed at the full open position (This curve will be referred to as "full open line", hereinbelow.), line B is the same in case that the transmission ratio is fixed (This curve will be referred to as "fixed gear line", hereinbelow.), and line C is the same in case that the engine output is fixed (This curve will be referred to as "fixed output line", hereinbelow.). In almost all the conventional automobiles, because a transmission having preset transmission ratios, e.g., first speed to fifth speed, is used and the engine speed-torque characteristics in the case of fixed transmission ratios are as shown by the fixed gear line B, it has been necessary to control the engine output by controlling the throttle valve opening degree. When it is assumed that the engine output is 80PS in a certain operating state on the fixed gear line B, e.g., operating state b corresponding to an engine speed of 3000 rpm and a torque T1, and when the engine speed is gradually lowered without changing the engine output, torque is increased along the fixed output line C as shown by the arrow c and takes value T2 at the intersection a of the fixed output line C and the full open line A, the value of the engine speed at the intersection a being 2000 rpm. This means that any engine output which has conventionally been obtained with a fixed transmission ratio can be obtained with the throttle valve fixed at the full open position by changing the transmission ratio. That is, by using a stepless transmission so that the transmission ratio can be continuously changed, there can be obtained a novel driving control system in which the automobile can be controlled to a desired operating state with the throttle valve held full open. Further, because the engine output and the vehicle speed can be ensured, with this control system, by changing the transmission ratio, an engine having the region D of the minimum specific fuel consumption near the full open line A as shown in FIG. 1c can be used. Further in this control system, the pressure in the intake passage downstream of the throttle valve cannot become negative and accordingly pumping loss of the engine output can be substantially reduced.

From the viewpoint of volatility of fuel, it is preferred that the throttle valve be held at a slightly closed position rather than the full open position. This is particularly true when the temperature of the engine is low.

The automotive driving control system of the present invention is based upon the concept described above, and comprises a stepless transmission provided between the engine and the driving wheels, a transmission controlling means for controlling the transmission ratio of the stepless transmission, a throttle valve driving means for driving the throttle valve of the engine, and a control means for controlling the transmission control means and the throttle valve driving means. The control means controls the transmission control means and the throttle valve driving means according to the amount of depression of the accelerator pedal, and when the amount of depression of the accelerator pedal is within a predetermined range, the control means controls the throttle valve driving means so that the opening degree of the throttle valve is fixed at a predetermined value irrespective of the amount of depression of the accelerator pedal, and the transmission control means to control the transmission ratio of the transmission so that the engine output corresponding to the amount of depression of the accelerator pedal can be obtained taking into account the predetermined value of the opening degree of the throttle valve.

In the system of the present invention, pumping loss of the engine output is reduced and volatility of fuel is improved by fixing the opening degree of the throttle valve at the predetermined value when the amount of depression of the accelerator pedal is within the predetermined range, and at the same time desired engine output corresponding to the amount of depression of the accelerator pedal can be ensured by controlling the transmission ratio according to the amount of depression of the accelerator pedal and the predetermined value of the opening degree of the throttle valve.

BRIEF DESCRIPTION OF THE DRAWINGS

FIGS. 7A and 7B, is a view for illustrating the operation of the CPU employed in the system, and FIG. 8, which is divided into FIGS. 8A and 8B, is a view for illustrating the operation of the CPU in accordance with another embodiment of the present invention.

DESCRIPTION OF THE PREFERRED EMBODIMENT

Figure 1A:
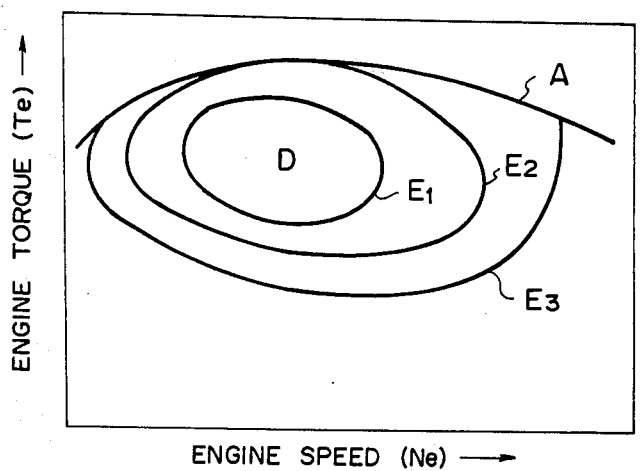
FIG. 1a shows constant specific fuel consumption regions in the case of conventional automobiles in which the abscissa and the ordinate respectively represent the engine speed Ne and the engine torque Te.
Figure 1B:
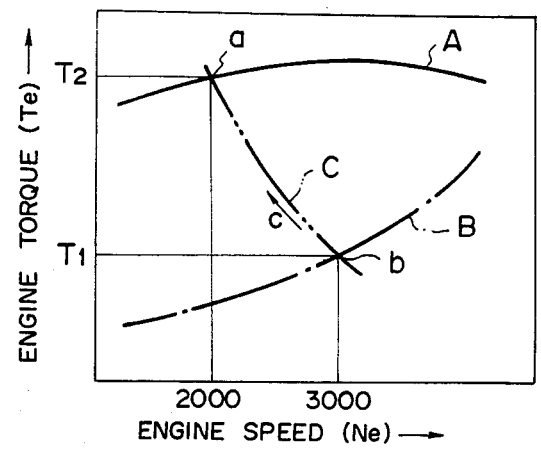
FIG. 1b shows engine speed-torque characteristic curves for illustrating the principle of the present invention.
Figure 1C:
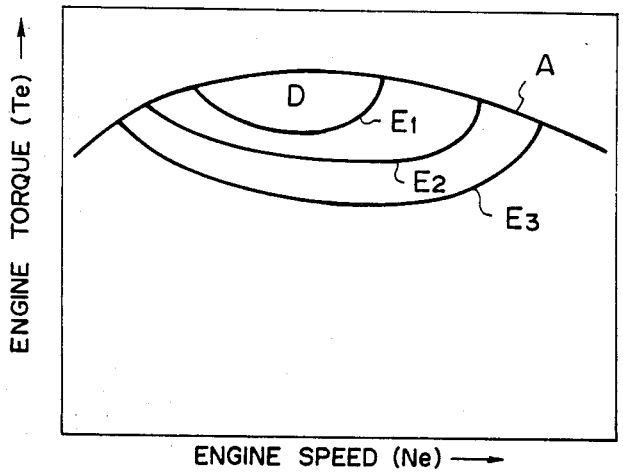
FIG. 1c is a view similar to FIG. 1a but in the case of an automobile provided with the driving control system in accordance with the present invention.
Figure 2:
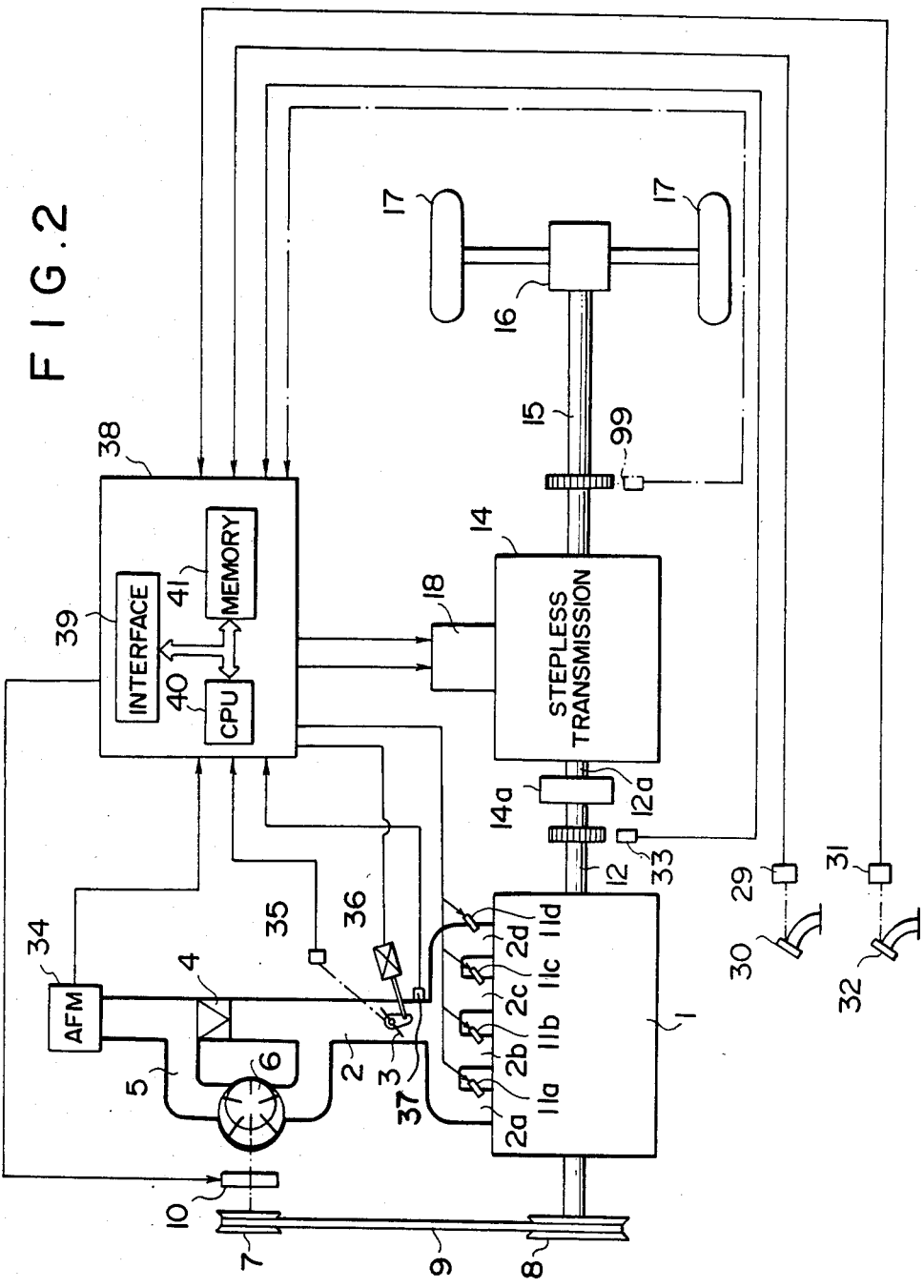
FIG. 2 is a schematic diagram of a driving control system in accordance with an embodiment of the present invention.

FIG. 2 shows an automotive driving control system in accordance with an embodiment of the present invention. In FIG. 2, an engine 1 is provided with a throttle valve 3 in its intake passage 2. A check valve 4 is disposed in the intake passage 2 upstream of the throttle valve 3 and a bypass passage 5 is provided to bypass the check valve 4. A supercharger 6 for increasing torque of the engine 1 is disposed in the bypass passage 5. The driving force of the engine 1 is delivered to the supercharger 6 by way of pulleys 7 and 8 and a belt 9, and an electromagnetic clutch 10 is inserted between the supercharger 6 and the pulley 7 to control the driving force delivered to the supercharger 6. The lower part of the intake passage 2 downstream of the throttle valve 3 is divided into four intake passages 2a to 2d, one for each cylinder. Fuel injection valves 11a to 11d are respectively disposed in the intake passages 2a to 2d.

To the output shaft 12 of the engine 1 is connected a stepless transmission 14 by way of a clutch 14a. The clutch 14a controls delivery of the driving force of the engine 1 to the input shaft 12a of the stepless transmission 14. The driving shaft 15 of the transmission 14 is connected to driving wheels 17 by way of a differential gear 16. The transmission ratio of the stepless transmission 14 is controlled by a transmission control device 18.

Figure 3:
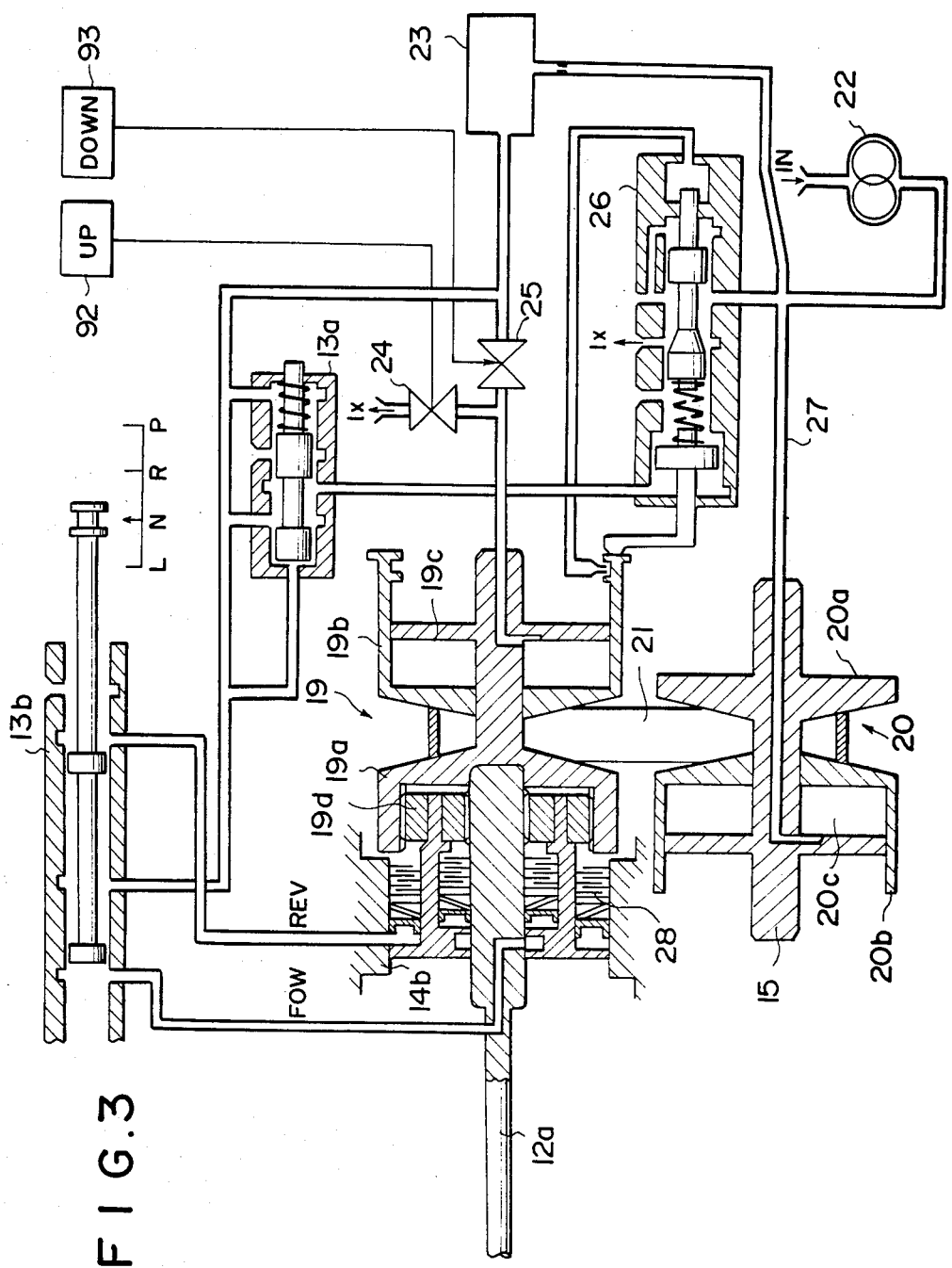
FIG. 3 is a schematic view showing the stepless transmission employed in the system of FIG. 2.

The stepless transmission 14 and the transmission control device 18 are shown in detail in FIG. 3. A primary pulley 19 is mounted on the input shaft 12a which is driven by the output shaft 12 of the engine 1. On the driving shaft 15 is mounted a secondary pulley 20. The pulleys 19 and 20 are connected with each other by way of a V-belt 21. The primary pulley 19 comprises a stationary pulley half 19a and a movable pulley half 19b which is opposed to the stationary pulley half 19a and is movable toward and away from the stationary pulley half 19a. A hydraulic pressure chamber 19c is defined behind the movable pulley half 19b. A planet gear 19d engages the input shaft 12a with the stationary pulley half 19a. A clutch 28, which is in the form of a hydraulic clutch, acts on the planet gear 19d in response to manual operation of a shift lever (not shown). When the shift lever is shifted into "forward" L, the hydraulic clutch 28 causes the planet gear 19d to be fixedly engaged with the input shaft 12a under the control of a manually operated valve 13b which is operated in response to operation of the shift gear, whereby the stationary pulley half 19a of the primary pulley 19 is rotated in the same direction as the input shaft 12a. On the other hand, when the shift lever is shifted into "reverse" R, the planet gear 19d is fixedly engaged with a casing 14b so that the stationary pulley half 19a is rotated in the direction opposite to the input shaft 12a. Similarly to the primary pulley 19, the secondary pulley 20 comprises a stationary pulley half 20a and a movable pulley half 20b which is opposed to the stationary pulley half 20a and is movable toward and away from the stationary pulley half 20a. A hydraulic presure chamber 20c is defined behind the movable pulley half 20b. The hydraulic pressure chambers 19c and 20c are connected to an oil pump 22 by way of an oil passage 27 which is provided with a regulator valve 23. A secondary valve 26 controls delivery and removal of hydraulic pressure to and from the hydraulic pressure chamber 20c of the secondary pulley 20 in response to movement of the movable pulley half 19b of the primary pulley 19. The space between the movable pulley half and the stationary pulley half of each pulley changes according to the hydraulic pressure applied to the corresponding hydraulic pressure chamber, and the V-belt 21 radially moves back and forth in response to the change in the space between the movable and stationary pulley halves. This changes the effective diameter of the primary and secondary pulleys 19 and 20, thereby permitting continuous change in the transmission ratio. A first solenoid valve 25 is provided between the regulator valve 23 and the hydraulic pressure chamber 19c of the primary pulley 19 in order to control delivery of hydraulic pressure to the hydraulic pressure chamber 19c. The first solenoid valve 25 opens upon receipt of a transmission-ratio-down signal 93 (to be described later) to deliver hydraulic pressure to the hydraulic pressure chamber 19c of the primary pulley 19, thereby moving the movable pulley half 19b toward the stationary pulley half 19a to reduce the space therebetween. When the movable pulley half 19b is moved toward the stationary pulley half 19a, the hydraulic pressure chamber 20c of the secondary pulley 20 is relieved under the control of the secondary valve 26 and the movable pulley half 20b is moved away from the stationary pulley half 20a to enlarge the space therebetween, whereby the transmission ratio of the stepless transmission 14 is reduced. Between the hydraulic pressure chamber 19c of the primary pulley 19 and the first solenoid valve 25 is provided a second solenoid valve 24 for controlling removal of hydraulic pressure from the hydraulic pressure chamber 19c of the primary pulley 19. The second solenoid valve 24 opens upon receipt of a transmission-ratio-up signal 92 (to be described later) to relieve hydraulic pressure from the hydraulic pressure chamber 19c, thereby moving the movable pulley half 19b away from the stationary pulley half 19a to enlarge the space therebetween. When the movable pulley half 19b is moved away from the stationary pulley half 19a, hydraulic pressure is delivered to the hydraulic pressure chamber 20c of the secondary pulley 20 under the control of the secondary valve 26 and the movable pulley half 20b is moved toward the stationary pulley half 20a to reduce the space therebetween, whereby the transmission ratio of the stepless transmission is increased. Reference numeral 13a denotes a clutch valve for breaking the driving connection between the primary and secondary pulleys 19 and 20 by way of the V-belt 21.

In FIG. 2, reference numeral 29 denotes an accelerator position sensor for detecting the amount of depression of the accelerator pedal 30, the amount of depression of the accelerator pedal 30 being regarded as a parameter of the engine output requirement in this embodiment. Reference numerals 31, 33 and 34 respectively denote a brake position sensor for detecting the amount of depression of a brake pedal 32, an engine speed sensor for detecting engine rpm, and an airflow meter for detecting the amount of intake air. Reference numerals 35, 36 and 37 respectively denote a throttle position sensor for detecting the opening degree of the throttle valve 3, a throttle valve actuator for opening and closing the throttle valve 3 and a pressure sensor for detecting the pressure in the intake passage 2.

Figure 4:
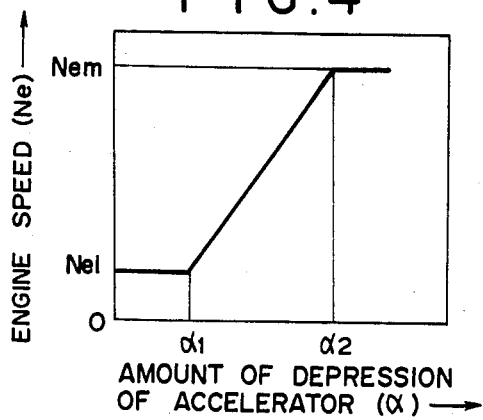
FIG. 4 is a view showing the characteristics of the first target engine speed stored in the memory employed in the system of FIG. 2.
Figure 5:
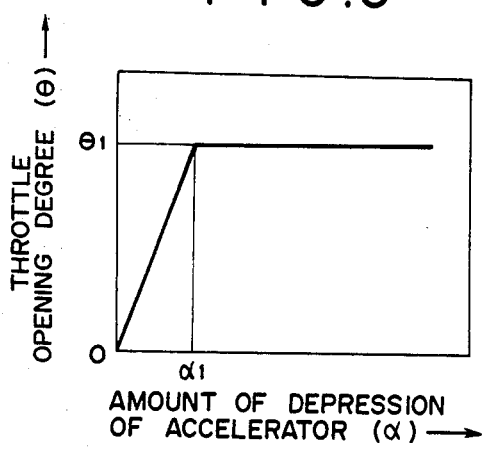
FIG. 5 is a view showing the characteristics of the target opening degree of the throttle valve stored in the memory.
Figure 6:
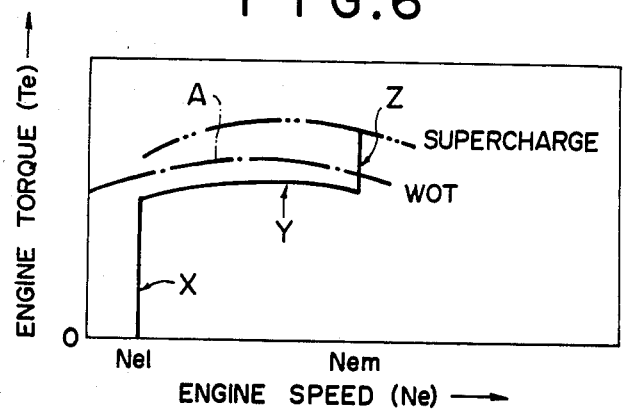
FIG. 6 is a view for illustrating the operation of the system, FIG. 7, which is divided into

Reference numeral 38 denotes a control circuit comprising an input/output interface 39, a CPU 40 and a memory 41. The memory 41 stores a program for operation, maps of first and second target engine speeds and a map of target opening degree of the throttle valve. In the map, the first target engine speed is related to the amount of depression of the accelerator pedal 30 as shown in FIG. 4. That is, the first target engine speed is held constant at a first value Ne1 when the amount of depression of the accelerator pedal 30 is smaller than a first preset value $\alpha1$, and at a second value Nem when the amount of depression $\alpha$ of the accelerator pedal 30 is larger than a second preset value $\alpha2$. When the amount of depression $\alpha$ of the accelerator pedal 30 is between the first and second preset values $\alpha1$ and $\alpha2$, the first target engine speed is substantially linearly increased with increase of the amount of depression $\alpha$ of the accelerator pedal 30. The target opening degree of the throttle valve is related to the amount of depression of the accelerator pedal 30 as shown in FIG. 5. That is, the target opening degree of the throttle valve is increased linearly with increase in the amount of depression $\alpha$ of the accelerator pedal 30 so long as the amount of depression $\alpha$ is smaller than the first preset value $\alpha1$, and is held at a predetermined constant value $\theta1$ when the amount of depression $\alpha$ is not smaller than the first preset value $\alpha1$. The CPU 40 receives detection signals from the sensors 29, 31, 33, 34, 35 and 37 and accomplishes predetermined operation to control the transmission control device 18, the throttle valve actuator 36, the fuel injection valves 11a to 11d and the supercharger 6 so that the engine speed-torque characteristics shown by the solid line in FIG. 6 are obtained. That is, when the amount of depression $\alpha$ of the accelerator pedal 30 is not larger than the first preset value $\alpha1$, the engine speed is held at the first value Ne1 and the opening degree of the throttle valve is changed according to the amount of depression $\alpha$ of the accelerator pedal 30 (the part of the solid line indicated at X). When the amount of depression $\alpha$ of the accelerator pedal 30 is between the first and second preset values $\alpha1$ and $\alpha2$, the opening degree of the throttle valve is held at the predetermined constant value $\theta1$ and at the same time the engine speed is changed according to the amount of depression $\alpha$ of the accelerator pedal 30 (the part of the solid line indicated at Y). When the amount of depression of the accelerator pedal 30 is larger than the second preset value $\alpha2$, the engine speed and the opening degree of the throttle valve are both held constant, respectively at the second value Nem and the predetermined constant value $\theta1$ (the part of the solid line indicated at Z). Further the CPU 40 reduces the opening degree of the throttle valve 3 and controls the engine speed according to the amount of depression $\beta$ of the brake pedal 32 when the amount of depression of the brake pedal 32 is larger than a preset value. As for control of the amount of fuel to be injected, the CPU 40 generates a fundamental fuel injection pulse appropriate for obtaining a stoichiometric air-fuel ratio $\lambda$ ($=1$) according to the engine speed and the amount of intake air when the amount of depression $\alpha$ of the accelerator pedal 30 is not larger than the second preset value $\alpha2$, while when the amount of depression $\alpha$ of the accelerator pedal 30 is larger than the second preset value $\alpha2$, the CPU 40 corrects the fundamental fuel injection pulse to the air-fuel mixture, for instance, to an air-fuel ratio of 13.5. Further the CPU 40 controls the electromagnetic clutch 10 so that supercharging is started and the driving force of the engine 1 is delivered to the supercharger 6 according to the amount of depression $\alpha$ of the accelerator pedal 30 when the amount of depression $\alpha$ of the accelerator pedal 30 exceeds the second preset value $\alpha2$.

Figure 7B:
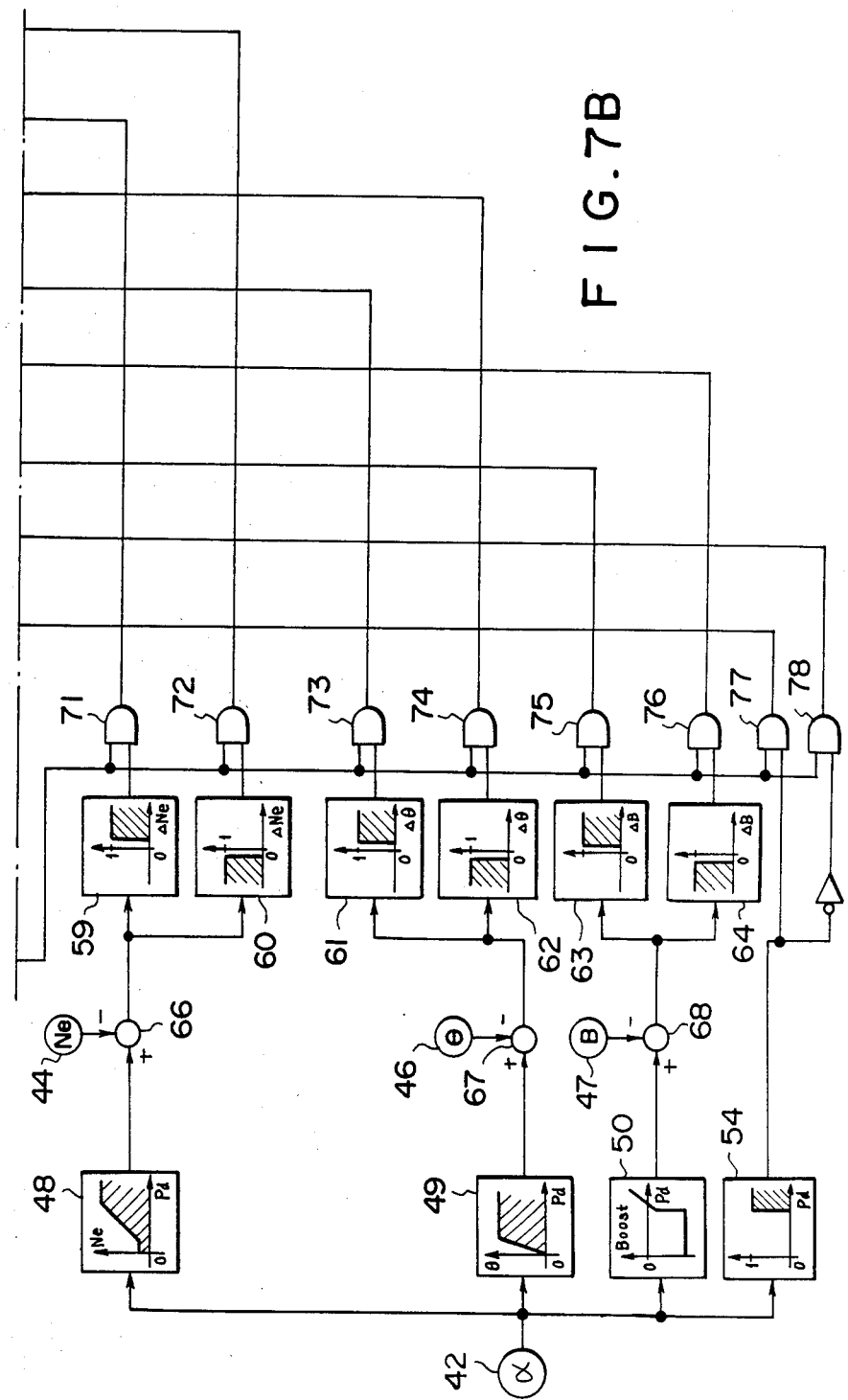

The operation of the CPU 40 is illustrated in FIG. 7 in which the operation of the CPU 40 is represented by hard circuitry for the sake of convenience of explanation. In FIG. 7, reference numerals 42 and 43 respectively denote an accelerator depression signal which is the detection signal of the accelerator position sensor 29, and a brake depression signal which is the detection signal of the brake position sensor 31. Reference numerals 44 and 45 both denote engine rpm signals from the engine speed sensor 33. Reference numerals 46 and 47 respectively denote a throttle opening degree signal which is the detection signal of the throttle position sensor 35, and an intake passage pressure signal which is the detection signal of the pressure sensor 37.

In FIG. 7, the rectangular frames which are indicated at reference numerals 48 to 51 and in which characteristic are curves depicted are function generators, the output of each function generator being related to the input thereinto as shown by the corresponding characteristic curve, the output and the input being respectively represented by values on the ordinate and the abscissa. Actually each characteristic curve is stored as a map and the CPU 40 reads out the memorized value of the output corresponding to a given input from the map. This is represented by the function generator in the hard circuitry in FIG. 7. More particularly, the function generator 48 represents a first target engine speed generator which receives the accelerator depression signal 42 representing the amount of depression $\alpha$ of the accelerator pedal 30 and generates the first target engine speed described above with reference to FIG. 4. The function generator 49 represents a target throttle opening degree generator which receives the accelerator depression signal 42 and generates the target opening degree of the throttle valve described above in conjunction with FIG. 7. The function generator 50 represents a target intake passage pressure generator which receives the accelerator depression signal 42 and generates a target pressure in the intake passage. The function generator 51 represents a second target engine speed generator which receives the brake depression signal 43 representing the amount of depression of the brake pedal 32 and generates a second target engine speed.

Further, in FIG. 7, the rectangular frames indicated at reference numerals 52 to 64 are determining means each for determining whether or not the input thereinto is larger than a preset value. Each determining means outputs "1" when the input thereinto falls within the hatched region shown in its rectangular frame. Reference numerals 65 to 68 respectively denote adders for adding two inputs, reference numerals 69 to 79 respectively denote AND gates, and reference numerals 80 to 85 respectively denote OR gates. Further, reference numerals 86 to 93 respectively denote control signals which are obtained when the signals from the gates 69 to 79 are "1". More particularly, reference numeral 86 denotes an air-fuel ratio enriching signal for enriching the air-fuel mixture. When the air-fuel ratio enriching signal 86 is generated, the fundamental fuel injection pulse is corrected to enrich the air-fuel mixture. Reference numeral 87 denotes a stoichiometric air-fuel ratio signal. When the stoichiometric air-fuel ratio signal 87 is generated, the fundamental fuel injection pulse is used as the injection pulse without being corrected so that the air-fuel ratio is set at the stoichiometric value. Reference numerals 88 and 89 respectively denote a supercharging-pressure-up signal for increasing the supercharging pressure, and a supercharging-pressure-down signal for reducing the supercharging pressure. Reference numerals 90 and 91 respectively denote a throttle-opening-degree-up signal for increasing the opening degree of the throttle valve 3, and a throttle-opening-degree-down signal for reducing the opening degree of the throttle valve 3. Further, reference numerals 92 and 93 respectively denote the aforesaid transmission-ratio-up signal for increasing the transmission ratio and transmission-ratio-down signal for reducing the transmission ratio.

Now, operation of the system of this embodiment will be briefly described referring to FIGS. 2 and 6. The output of the engine 1 is delivered to the driving wheels 17 by way of the stepless transmission 14 and the differential gear 16. The CPU 40 in the control circuit 38 receives the detecting signals from the accelerator position sensor 29, the brake position sensor 31, the engine speed sensor 33, the airflow meter 34 and the pressure sensor 37, and accomplishes the predetermined operation. When the amount of depression $\alpha$ of the accelerator pedal 30 smaller than the first preset value (i.e., during low speed light load operation of the engine), the CPU 40 controls the transmission control device 18 and the throttle valve actuator 36 to hold the engine speed constant at said first value Ne1, as shown by the part of the solid line indicated at X in FIG. 6, which is the minimum value within the stability limit, and at the same time to change the opening degree of the throttle valve with change in the amount of depression $\alpha$ of the accelerator pedal 30, and at the same time the CPU 40 controls the amount of fuel to be injected from the fuel injection valves 11a to 11d so that the air-fuel ratio is set at a stoichiometric value, thereby ensuring the engine output requirement by only changing the opening degree of the throttle valve 3.

When the operating state of the vehicle changes from low speed travel to steady running state and the amount of depression $\alpha$ of the accelerator pedal 30 becomes between the first and second preset values $\alpha1$ and $\alpha2$, the CPU 40 controls the transmission control device 18 and the throttle valve actuator 36 to hold constant the opening degree of the throttle valve 3 near full open and to change the engine speed with change in the amount of depression $\alpha$ of the accelerator pedal 30 as shown by the part of the solid line indicated at Y in FIG. 6, and at the same time the CPU 40 controls the air-fuel ratio to the stoichiometric value, thereby ensuring the engine output requirement by only changing the engine speed.

When the operating state of the vehicle changes to high speed heavy load operation as during high speed travel of the vehicle or during acceleration of the vehicle, and the amount of depression $\alpha$ of the accelerator pedal 30 exceeds the second preset value $\alpha2$, the CPU 40 controls the transmission control device 18 and the throttle valve actuator 36 to hold the engine speed and the opening degree of the throttle valve 3 constant respectively at the second value Nem and the predetermined constant value $\theta1$ as shown by the part of the solid line indicated at Z in FIG. 6, and at the same time the CPU 40 controls amount of the fuel to be injected so that air-fuel mixture is enriched and actuates the electromagnetic clutch 10 to change the supercharging pressure of the supercharger 6 according to the amount of depression $\alpha$ of the accelerator pedal 30, thereby increasing engine torque and ensuring engine output larger than the maximum engine output without supercharging.

When the brake pedal 32 is pushed down to decelerate the vehicle, the CPU 40 controls the throttle valve actuator 36 to reduce the opening degree of the throttle valve 3 and controls the transmission control device 18 to change the engine speed according to the amount of depression $\beta$ of the brake pedal 32, thereby producing engine-brake effect having a magnitude corresponding to the amount of depression $\beta$ of the brake pedal 32, which decelerates the vehicle together with the ordinary braking system.

Now operation of the system of this embodiment will be described in detail referring to FIG. 7. While the accelerator pedal 30 is pushed down, normally the brake pedal 32 is not pushed down, and accordingly the determining means 53 outputs "1" to open all the AND gates 71 to 78. At the same time the determining means 56 outputs "1" to open the AND gate 79 since the engine speed Ne is higher than the minimum speed. When the amount of depression $\alpha$ of the accelerator pedal 30 is not larger than the first preset value $\alpha1$ in this state, the first target engine speed generator 48 generates the first value Ne1 which is a fixed value, and the adder 66 calculates the difference between the first value Ne1 and the actual engine speed Ne. When the actual engine speed Ne is lower than the first value Ne1, the determining means 59 outputs "1" which signal constitutes the transmission-ratio-up signal 92 after passing through the AND gate 71 and the OR gate 84, whereby the transmission ratio of the stepless transmission 14 is increased and the actual engine speed Ne is increased. On the other hand, when the actual engine speed Ne is higher than the first value Ne1, the determining means 60 outputs "1" which signal constitutes the transmission-ratio-down signal 93 after passing through the AND gate 72 and the OR gate 85, whereby the transmission ratio of the transmission 14 is reduced and the actual engine speed Ne is lowered. When the actual engine speed Ne is equalized to the first value Ne1, the outputs of the determining means 59 and 60 both turn to "0" and accordingly the actual engine speed Ne is held constant at the first value Ne1.

At the same time, the target throttle opening degree generator 49 generates the target opening degree of the throttle valve 3 corresponding to the amount of depression $\alpha$ of the accelerator pedal 30 represented by the accelerator depression signal 42, and the adder 67 calculates the difference between the target opening degree of the throttle valve 3 and the actual opening degree $\theta$ of the throttle valve 3. When the latter is smaller than the former, the determining means 61 outputs "1" which signals constitutes the throttle-opening-degree-up signal 90 after passing through the AND gate 73 and the OR gate 82, whereby the opening degree of the throttle valve 3 is increased. On the other hand when the actual opening degree $\theta$ of the throttle valve 3 is larger than the target opening degree of the throttle valve 3, the determining means 62 outputs "1" which signal constitutes the throttle-opening-degree-down signal 91 after passing through the AND gate 74, the OR gate 83 and the AND gate 79, whereby the opening degree of the throttle valve 3 is reduced. When the actual opening degree $\theta$ of the throttle valve 3 is equalized to the target opening degree, the outputs of the determining means 61 and 62 both turn to "0" and neither the throttle-opening-degree-up signal 90 nor the throttle-opening-degree-down signal 91 is generated, whereby the opening degree of the throttle valve 3 is controlled to the value corresponding to the amount of depression $\alpha$ of the accelerator pedal 30.

Further, because the amount of depression $\alpha$ of the accelerator pedal 30 is not larger than the second preset value $\alpha 2$, the output of the determining means 54 is kept at "0", and the signal "1", which is the inverted signal of the output of the determining means 54, constitutes the stoichiometric air-fuel ratio signal 87 after passing through the AND gate 78 and the OR gate 80, whereby the fundamental fuel injection pulse which is determined according to the engine speed and the amount of intake air is directly fed to the fuel injection valves 11$a$ to 11$d$ without correction to control the air-fuel ratio to the stoichiometric value $\lambda = 1$. The target intake passage pressure generator 50 generates the target pressure in the intake passage corresponding to the amount of depression $\alpha$ of the accelerator pedal 30, but when the amount of depression $\alpha$ of the accelerator pedal 30 is not larger than the second preset value $\alpha 2$, the target pressure in the intake passage is lower than the actual pressure B in the intake passage, and accordingly the supercharging-pressure-down signal is generated, whereby the supercharger 6 is not actuated.

When the amount of depression $\alpha$ of the accelerator pedal 30 is increased to between the first and second preset values $\alpha 1$ and $\alpha 2$ from below the first preset value $\alpha 1$, the first target engine speed generator 48 generates the first target engine speed corresponding to the amount of depression of the accelerator pedal 30, and at the same time the target throttle opening degree generator 49 generates the predetermined constant value $\theta 1$ near the full open value, whereby the transmission control device 18 and the throttle actuator 36 are controlled in the manner similar to that described above to equalize the actual engine speed to the target engine speed corresponding to the amount of depression $\alpha$ of the accelerator pedal 30 and to hold the opening degree of the throttle valve 3 at the predetermined constant value $\theta 1$ near the full open value. Further, the air-fuel ratio is controlled to the stoichiometric value and supercharging is not carried out at this time.

When the amount of depression $\alpha$ of the accelerator pedal 30 becomes larger than the second preset value $\alpha 2$, the first target engine speed generator 48 generates the second value Nem which is a fixed value, and the target throttle opening degree generator 49 generates the constant value $\theta 1$ which is a fixed value near the full open value. The transmission control device 18 and the throttle actuator 36 are controlled to converge the actual engine speed to the second value Nem and to equalize the opening degree of the throttle valve to the constant value $\theta 1$. Further, when the amount of depression $\alpha$ of the accelerator pedal 30 is larger than the second preset value $\alpha 2$, the target intake passage pressure generator 50 generates the target pressure in the intake passage corresponding to the amount of depression $\alpha$ of the accelerator pedal 30, and the adder 68 calculates the difference between the target pressure in the intake passage and the actual pressure B in the intake passage. In the early stage of this state in which the actual pressure B in the intake passage is lower than the target pressure, the determining means 63 outputs signal "1" and the signal "1" constitutes the supercharging-pressure-up signal 88 after passing through the AND gate 75, whereby the electromagnetic clutch 10 is controlled to start supercharging and the driving force of the engine delivered to the supercharger 6 is increased. When the actual pressure B in the intake passage becomes higher than the target pressure, the output signal of the determining means 64 turns to "1", and the signal "1" constitutes the supercharging-pressure-down signal 89 after passing through the AND gate 76 and the OR gate 81, whereby the electromagnetic clutch 10 is controlled to reduce the driving force of the engine delivered to the supercharger 6. When the actual pressure B in the intake passage is equalized to the target pressure corresponding to the amount of depression $\alpha$ of the accelerator pedal 30, the output of the adder 68 becomes zero, whereby neither the supercharging-pressure-up signal 88 nor the supercharging-pressure-down signal 89 is generated and the supercharging pressure is held at the target pressure corresponding to the amount of depression $\alpha$ of the accelerator pedal 30. At the same time, the determining means 54 outputs "1" because the amount of depression $\alpha$ of the accelerator pedal 30 is larger than the second preset value $\alpha 2$, and the signal "1" constitutes the air-fuel ratio enriching signal 86 after passing through the AND gate 77. The air-fuel ratio enriching signal 86 corrects the fundamental fuel injection pulse to be fed to the fuel injection valves 11a to 11d so that the air-fuel ratio is enriched.

When the accelerator pedal 30 is released and the brake pedal 32 is pushed down, the output of the determining means 53 turns to "0" to close all the AND gates 71 to 78, and at the same time the output of the determining means 52 turns to "1" to open the AND gates 69 and 70. The signal "1" from the determining means 52 constitutes the stoichiometric air-fuel ratio signal 87 after passing through the OR gate 80, the supercharging-pressure-down signal 89 after passing through the OR gate 81 and the throttle-opening-degree-down signal 91 after passing through the OR gate 83 and AND gate 79, whereby the air-fuel ratio is controlled to the stoichiometric value, supercharging is interrupted, and the throttle valve 3 is closed. Further, the second target engine speed generator 51 generates the second target engine speed corresponding to the amount of depression $\beta$ of the brake pedal 32, and the adder 65 calculates the difference between the second target engine speed and the actual engine speed Ne. When the former is higher than the latter, the determining means 57 outputs "1" which signal constitutes the transmission-ratio-up signal 92 after passing through the AND gate 69 and the OR gate 84, whereby the transmission ratio is increased to increase the actual engine speed Ne. On the other hand, when the actual engine speed Ne is higher than the second target engine speed, the determining means 58 outputs "1" which signal constitutes the transmission-ratio-down signal 93 after passing through the AND gate 70 and OR gate 85, whereby the transmission ratio is reduced to reduce the engine speed. When the actual engine speed Ne is equalized to the second target engine speed, the output of the adder 65 turns to "0", and accordingly neither the transmission-ratio-up signal 92 nor the transmission-ratio-down signal 93 is generated.

The system of this embodiment is advantageous in the following points.

1. Because the throttle valve is fixed at a position near the full open position and the engine output requirement is satisfied by changing the engine speed during steady running of the vehicle, the pressure in the intake passage downstream of the throttle valve cannot become negative and accordingly pumping loss of the engine output cannot occur, whereby specific fuel consumption can be substantially improved.

2. Because only the engine speed is controlled during steady running of the vehicle, control is simplified as compared with conventional systems in which both the engine speed and the engine torque are controlled by controlling the throttle valve opening degree.

3. Because the air-fuel ratio is controlled to the stoichiometric value during steady running of the vehicle, the specific fuel consumption is further improved.

4. In order to obtain low output of the engine with the throttle valve being fixed during low speed operation of the engine, the gear of the transmission must be enlarged in diameter. Accordingly, generally it is necessary to more or less close the throttle valve. However, when the throttle valve is closed by a large amount, pumping loss of the engine output is apt to occur to lower the specific fuel consumption. In the system of this embodiment, the engine speed is maintained at the minimum value within the stability limit and the engine output requirement is ensured by changing the opening degree of the throttle valve during low speed light load operation of the engine. Therefore, the amount by which the throttle valve is to be closed during such operating state of the engine may be relatively small, and pumping loss of the engine output is reduced, without adversely affecting the stability of the engine.

5. In order to obtain the engine output required in high speed travel or acceleration of the vehicle without moving the throttle valve during high speed heavy load operation of the engine, the engine must be operated at such high speed that the engine may possibly be damaged. In the system of this embodiment, the engine output required in high speed travel or acceleration of the vehicle is obtained by carrying out supercharging and enriching the air-fuel mixture. Therefore, sufficient performance in high speed travel and acceleration of the vehicle is ensured without excessively increasing the engine speed.

6. Because the throttle valve is closed and at the same time the engine speed is controlled to the value corresponding to the amount of depression of the brake pedal during braking, an optimal engine brake force can be obtained according to the amount of depression of the brake pedal.

Though in the above embodiment, the amount of depression $\alpha$ of the accelerator pedal is regarded as a parameter of engine output requirement, it may be regarded as a parameter of vehicle speed requirement. FIG. 8 shows another embodiment of the present invention in which the amount of depression $\alpha$ of the accelerator pedal is regarded as a parameter of vehicle speed requirement. In FIG. 8, analogous or corresponding parts are given the same reference numerals as in FIG. 7. In FIG. 8, reference numeral 94 denotes a vehicle speed signal outputted from a vehicle speed sensor (shown by dash-dot line 99 in FIG. 2), and the reference numeral 95 denote an adder for calculating the difference between the actual vehicle speed Vc represented by the vehicle speed signal 94 and the accelerator depression signal 42 which is a parameter of vehicle speed requirement. Reference numeral 96 denotes an integrator which integrates the output of the adder 96 to calculate the engine output corresponding to the vehicle speed requirement. Reference numeral 97 denotes an engine output generator for reading out, from a map, an engine output corresponding to the output of the adder 95 so that the output of the adder 95 is nullified. The reference numeral 98 denotes an adder which adds the integrated value from the integrator 96 and the output of the engine output generator 97.

In the system of this embodiment, the amount of depression $\alpha$ of the accelerator pedal is regarded as the vehicle speed requirement, and the engine output requirement Pd is calculated from the difference between the amount of depression $\alpha$ of the accelerator pedal and the actual vehicle speed Vc. Subsequently the same control as in the embodiment described in FIG. 7 is carried out using the engine output requirement Pd. Further, because an integrating element is included in the circuitry for calculating the engine output requirement, feedback is provided to nullify the difference between the amount of depression $\alpha$ of the accelerator pedal and the actual vehicle speed Vc, whereby the difference is nullified during steady running of the vehicle, and the engine output is equalized to the running load of the engine output requirement Pd.

Though in the above embodiments, the opening degree of the throttle valve during steady travel of the vehicle is fixed at a value near full open, it may be fixed at full open or at a value smaller than full open by a relatively large amount. Further, the air-fuel ratio during steady travel of the vehicle may be leaner than the stoichiometric value.

Though in the above embodiments, supercharging is effected during high speed heavy load operation of the engine and the supercharging pressure is linearly controlled, on-off control of the supercharging may be effected instead of the linear-control. If desired, supercharging need not be effected. Further, though in the above embodiments, the air-fuel ratio during high speed heavy load operation of the engine is enriched, it may be of the stoichiometric value.

Further, though in the above embodiments, the engine speed is maintained at the minimum value within the stability limit, and the opening degree of the throttle valve is changed during low speed light load operation, other controls may be effected. For example, both the engine speed and the opening degree of the throttle valve may be regulated.

We claim:

1. An automotive driving control system comprising a stepless transmission provided between an engine and driving wheels, a transmission control means for controlling the transmission ratio of the stepless transmission, a throttle valve driving means for driving the throttle valve of the engine, an accelerator position detecting means for detecting the amount of depression of the accelerator pedal, an actuable engine torque increasing means for increasing engine torque, and control means which receives the signal from the accelerator position detecting means and controls the transmission control means and the throttle valve driving means according to the amount of depression of the accelerator pedal, said control means being adapted to control, when the amount of depression of the accelerator pedal is within a predetermined range between first and second preset values, the throttle valve driving means so that the opening degree of the throttle valve is fixed at a near full open position irrespective of the amount of depression of the accelerator pedal, and to control the transmission control means to control the transmission ratio of the stepless transmission to change the engine speed so that the engine output requirement represented by the amount of depression of the accelerator pedal can be obtained with the near full open position of the throttle valve, said first preset value being smaller than said second preset value; when the amount of depression of the accelerator pedal is not larger than the first preset value, to control the transmission control means to control the transmission ratio of the stepless transmission so that the engine speed is maintained at the minimum stable speed and to control the throttle valve driving means to control the opening degree of the throttle valve so that the engine output requirement represented by the amount of depression of the accelerator pedal can be obtained; and when the amount of depression of the accelerator pedal is larger than the second preset value, controls the transmission control means to control the transmission ratio of the stepless transmission so that the engine speed is maintained at the maximum stable speed and said engine torque increasing means is actuated so that engine torque is increased.

2. An automotive driving control system as defined in claim 1 in which said engine torque increasing means is a supercharger.

3. An automotive driving control system as defined in claim 1 in which said control means regards the amount of depression of the accelerator pedal as the parameter of the vehicle speed requirement and determines said engine output requirement on the basis of the difference between the vehicle speed and the amount of depression of the accelerator pedal.

4. An automotive driving control system as defined in claim 1 in which a minimum specific fuel consumption region (D) is set to intersect a contour line (A), which represents the full opening degree of the throttle valve in a plot of engine torque vs. engine speed.

5. An automotive driving control system as defined in claim 1, further comprising a brake detecting means for detecting the application of the brakes and for controlling the opening degree of the throttle valve to decrease during braking.

6. An automotive driving control system as defined in claim 5 in which the control of the opening degree of the throttle valve during braking is changed according to the amount of depression of the brake pedal.

7. An automotive driving control system as defined in claim 1 in which said torque increasing means is adapted to control the air-fuel ratio, said air-fuel ratio being controlled to become rich when the amount of depression of the accelerator pedal is larger than said second preset value.

8. An automotive driving control system comprising a stepless transmission provided between an engine and driving wheels; a transmission control means for controlling the transmission ratio of the stepless transmission; a throttle valve driving means for driving the throttle valve of the engine; an accelerator position detecting means for detecting the amount of depression of the accelerator pedal; and actuable engine torque increasing means for increasing engine torque; and a control means which receives the signal from the accelerator position detecting means and controls the transmission control means, the throttle valve driving means and the engine torque increasing means to provide the engine output requirement represented by the amount of depression of the accelerator pedal; said control means including a memory means for storing, as a predetermined map, a characteristic curve of engine speed vs. amount of depression of the accelerator pedal, said control means further being adapted to control, when the amount of depression of the accelerator pedal is within a predetermined range between first and second present values, the throttle valve driving means so that the opening degree of the throttle valve is fixed at a near full open position irrespective of the amount of depression of the accelerator pedal, and to control the transmission control means to control the transmission ratio of the stepless transmission to change the engine speed so that the engine output requirement represented by the amount of depression of the accelerator pedal can be obtained with the near full open position of the throttle valve, said first present preset value being smaller than said second preset value; when the amount of depression of the accelerator pedal is not larger than the first preset value, to control the transmission control means to control the transmission ratio of the stepless transmission so that the engine speed is maintained at the minimum stable speed and to control the throttle valve driving means to control the opening degree of the throttle valve so that the engine output requirement represented by the amount of depression of the accelerator pedal can be obtained; and when the amount of depression of the accelerator pedal is larger than the second preset value, controls the transmission control means to control the transmission ratio of the stepless transmission so that the engine speed is maintained at the maximum stable speed and said engine torque increasing means is actuated so that engine torque is increased; and a processing means for controlling said transmission control means to control said transmission ratio to maintain said engine speed in accord with said predetermined map in response to the amount of depression of the accelerator pedal.

9. An automotive driving control system comprising a stepless transmission provided between an engine and driving wheels; a transmission control means for controlling the transmission ratio of the stepless transmission; a throttle valve driving means for driving the throttle valve of the engine; an accelerator position detecting means for detecting the amount of depression of the accelerator pedal; and actuable engine torque increasing means for increasing engine torque; and a control means which receives the signal from the accelerator position detecting means and controls the transmission control neans, the throttle valve driving means and the engine torque increasing means to provide the engine output requirement represented by the amount of depression of the accelerator pedal; said control means including a memory means for storing, as a predetermined map, a characteristic curve of engine speed vs. amount of depression of the accelerator pedal, said characteristic curve comprising a first constant speed portion when said amount of depression of the accelerator is not larger than a first preset value; a second constant speed portion when said amount of depression of the accelerator is larger than a second preset value, said second preset value being larger than said first preset value, said first constant speed being less than said second constant speed; and a transmission portion connecting said first and second constant speed portions wherein said engine speed varies linearaly with the amount of depression of the accelerator pedal; and a processing means for controlling said transmission control means to control said transmission ratio to maintain said engine speed in accord with said predetermined map in response to the amount of depression of the accelerator pedal.

10. An automotive driving control system as defined in claim 8 in which said engine torque increasing means is a supercharger.

11. An automotive driving control system as defined in claim 8 in which said control means regards the amount of depression of the accelerator pedal as the parameter of the vehicle speed requirement and determines said engine output requirement on the basis of the difference between the vehicle speed and the amount of depression of the accelerator pedal.

12. An automotive driving control system as defined in claim 8 in which a minimum specific fuel consumption region (D) is set to intersect a contour line (A), which represents the full opening degree of the throttle valve in a plot of engine torque vs. engine speed.

13. An automotive driving control system as defined in claim 8, further comprising a brake detecting means for detecting the application of the brakes and for controlling the opening degree of the throttle valve to decrease during braking.

14. An automotive driving control system as defined in claim 17 in which the control of the opening degree of the throttle valve during braking is changed according to the amount of depression of the brake pedal.

15. An automotive driving control system as defined in claim 8 in which said torque increasing means is adapted to control the air-fuel ratio, said air-fuel ratio being controlled to become rich when the amount of depression of the accelerator pedal is larger than said second preset value.

* * * * *